US011181661B2

(12) United States Patent
Kraft et al.

(10) Patent No.: US 11,181,661 B2
(45) Date of Patent: Nov. 23, 2021

(54) IDENTIFYING ANTENNA SYSTEM PARAMETER CHANGES

(71) Applicant: Baker Hughes, a GE company, LLC, Houston, TX (US)

(72) Inventors: Kersten Kraft, Celle (DE); Trung H. Le, Celle (DE)

(73) Assignee: BAKER HUGHES HOLDING LLC, Houston, TX (US)

( * ) Notice: Subject to any disclaimer, the term of this patent is extended or adjusted under 35 U.S.C. 154(b) by 46 days.

(21) Appl. No.: 16/348,827

(22) PCT Filed: Nov. 16, 2017

(86) PCT No.: PCT/US2017/062067
§ 371 (c)(1),
(2) Date: May 9, 2019

(87) PCT Pub. No.: WO2018/094083
PCT Pub. Date: May 24, 2018

(65) Prior Publication Data
US 2020/0033502 A1    Jan. 30, 2020

Related U.S. Application Data

(60) Provisional application No. 62/585,948, filed on Nov. 14, 2017.

(51) Int. Cl.
*G01V 13/00* (2006.01)
*G01V 3/28* (2006.01)

(52) U.S. Cl.
CPC ............. *G01V 13/00* (2013.01); *G01V 3/28* (2013.01)

(58) Field of Classification Search
CPC . G01V 13/00; G01V 3/28; G01V 3/30; G01V 3/26
See application file for complete search history.

(56) References Cited

U.S. PATENT DOCUMENTS

2015/0241596 A1* 8/2015 Donderici .............. G01V 13/00
324/338
2017/0218752 A1* 8/2017 Donderici ................ G01V 3/28
2018/0292558 A1* 10/2018 Wilson ................. H01Q 21/064
(Continued)

*Primary Examiner* — Akm Zakaria
(74) *Attorney, Agent, or Firm* — Mossman Kumar & Tyler PC

(57) ABSTRACT

Systems, methods, and devices for evaluation of an earth formation intersected by a borehole using a logging tool. Methods include performing EM logging in a borehole intersecting an earth formation using a measurement signal from an antenna system in the borehole, the measurement signal dependent upon a parameter of interest of the formation and at least one antenna system parameter of the antenna system, comprising feeding a calibration signal into a signal path of the antenna system to generate a resultant signal; estimating at least one value of the at least one antenna system parameter by using the resultant signal; and performing further logging operations in dependence upon the at least one value of the at least one antenna system parameter. The calibration signal comprises at least two calibration subsignals with a first calibration subsignal having a first frequency and a second calibration subsignal having a second frequency.

24 Claims, 10 Drawing Sheets

(56) References Cited

U.S. PATENT DOCUMENTS

2019/0086350 A1\* 3/2019 Cerepi ................. G01V 3/26
2019/0120994 A1\* 4/2019 Servin ................. E21B 43/32
2019/0137646 A1\* 5/2019 Frey ..................... G01V 3/30

\* cited by examiner

IDENTIFYING ANTENNA SYSTEM PARAMETER CHANGES

FIELD

In one aspect, the present disclosure generally relates to methods, systems, and devices for earth formation evaluation including determining properties of the earth formation. More specifically, the present disclosure relates to electromagnetic logging in a borehole penetrating the earth formation. These measurements may be used in exploration for hydrocarbons and/or water in the earth formation.

BACKGROUND

Electrical well logging is well known and various devices and various techniques have been described for this purpose. Properties of the formation may be estimated by creating electromagnetic (EM) excitation in the formation with at least one transmitter, and receiving related signals at one or more receiver antennas. The transmitter antenna and receiver antenna may be the same antenna. Estimation of these properties aids in understanding the structure of the earth formation, which enables and/or facilitates exploration and development of the formation.

Logging instruments may be used to estimate parameters of interest, such as formation properties used for characterizing, modeling, and conducting operations on the formation. Historically, measurements of resistivity, or its inverse, conductivity, and permittivity have been used for, among other reasons, inferring the fluid content of the earth formations and distances to bed boundaries. Also, lower conductivity (higher resistivity) measurements may be indicative of hydrocarbon-bearing earth formations. More recently, logging instruments have been included as part of a drilling system to conduct logging-while-drilling (LWD) or measurement-while-drilling (MWD).

SUMMARY

In aspects, the present disclosure is related to systems, methods and devices for evaluating an earth formation intersected by a borehole using a logging tool. Method aspects include performing electromagnetic (EM) logging in a borehole intersecting an earth formation using a measurement signal from an antenna system in the borehole, the measurement signal dependent upon a parameter of interest of the formation and at least one antenna system parameter of the antenna system.

Methods may include feeding a calibration signal into a signal path of the antenna system to generate a resultant signal; estimating at least one value of the at least one antenna system parameter by using the resultant signal; and performing further logging operations in dependence upon the at least one value of the at least one antenna system parameter. The calibration signal may include at least two calibration subsignals with a first calibration subsignal of the at least two calibration subsignals having a first frequency and a second calibration subsignal of the at least two calibration subsignals having a second frequency different than the first frequency. A first signal of the at least two calibration subsignals may be fed into the signal path during a period of time that overlaps with a second signal of the at least two calibration subsignals fed into the signal path. A first subsignal of the at least two calibration subsignals may be fed into the signal path during a first period of time and a second subsignal of the at least two calibration subsignals may be fed into the signal path during a second period of time different than the first period of time.

The at least one antenna system parameter may include at least one of: i) a transfer function of at least a part of the antenna system; ii) a frequency of an extreme value of the transfer function of at least a part of the antenna system; and iii) a width of a peak of the transfer function. The at least one antenna system parameter may include at least one of: i) resonance frequency of the antenna system; ii) antenna system impedance; iii) antenna system moment; iv) antenna system inductance; v) antenna system capacitance; vi) antenna system resistance; and vii) antenna system quality factor.

The antenna system may include a transmitter assembly configured to transmit an excitation signal and a receiver assembly configured to receive the measurement signal. The calibration signal may include at least three calibration subsignals, with each calibration subsignal of the at least three calibration subsignals having a unique frequency. The at least three calibration subsignals may form at least one swept frequency signal.

Methods may also include monitoring values of the antenna system parameter over time; detecting changes in values of the antenna system parameter meeting a threshold value; and responsive to detecting antenna system parameter changes meeting the threshold value, performing at least one of: i) storing at least one of the values; ii) transmitting at least one of the values to the surface; and iii) notifying a system operator.

Performing further logging operations may comprise determining a value of the parameter of interest of the formation. Performing further logging operations may comprise performing at least one of: i) adjustment of a measurement signal; ii) adjustment of the signal path; and iii) adjustment of an excitation signal of the logging tool.

Methods may include estimating a resonance frequency of the antenna system by performing at least one of: i) estimating a frequency of an extreme value of the transfer function of at least a part of the system; and ii) estimating a width of a resonance peak of a transfer function. The antenna system may comprise at least one electronic component, and the logging operation may include adjustment of at least one of the at least one electronic component.

Other methods for performing electromagnetic (EM) logging in a borehole intersecting an earth formation using a measurement signal from an antenna system on a logging tool in the borehole may include conveying a carrier into a borehole intersecting the formation; feeding a calibration signal into a signal path of the logging tool to generate a resultant signal; estimating at least one value of the at least one antenna system parameter by using the resultant signal from feeding the calibration signal into the signal path of the logging tool; monitoring values of the antenna system parameter over time; detecting changes in values of the antenna system parameter meeting a threshold value; and performing an action responsive to detecting antenna system parameter changes meeting the threshold value. The action may include performing at least one of: i) storing at least one of the values; ii) transmitting at least one of the values to the surface; and iii) notifying an operator of the drilling system. The action may include performing further logging operations in dependence upon the at least one value of the at least one antenna system parameter and the measurement signal. Performing further logging operations may include determining a value of the parameter of interest of the formation. Performing further logging operations may include performing at least one of: i) adjustment of a measurement signal; ii)

adjustment of the signal path; and iii) adjustment of an excitation signal of the logging tool.

Apparatus embodiments may include an electromagnetic (EM) logging tool configured for conveyance in the borehole on a tool string, and further configured to generate an excitation in the formation with an EM signal from at least one antenna system on the tool at at least one frequency; at least one receiver assembly on the EM tool configured to make EM measurements by receiving a signal at the at least one antenna system responsive to the excitation; at least one processor; and an antenna system including an antenna connected to the at least one processor via a signal path and configured to provide a measurement signal to the at least one processor responsive to the EM measurements. The at least one processor may be further configured to carry out methods of the present disclosure as described herein. The at least one processor may include one or more computer processors operatively coupled with at least one computer memory and configured so the computer memory is accessible to the at least one processor. The computer memory may be implemented as a non-transitory computer readable medium having disposed thereon computer program instructions for implementing the methods described herein.

The at least one processor may be configured to feed a calibration signal into the signal path of the logging tool to generate a resultant signal; estimate at least one value of the at least one antenna system parameter by using the resultant signal; and perform further logging operations in dependence upon the at least one value of the at least one antenna system parameter. The calibration signal may comprise at least two calibration subsignals with a first subsignal of the at least two calibration subsignals having a first frequency and a second subsignal of the at least two calibration subsignals having a second frequency different than the first frequency. The measurement signal may be dependent upon a parameter of interest of the formation and at least one antenna system parameter of the antenna system. The apparatus may comprise a tool string. The tool string may be a drill string, and the apparatus comprises a drill bit at a distal end of the drill string. The antenna system may include a transmitter assembly configured to transmit an excitation signal and a receiver assembly configured to receive the measurement signal. The apparatus may include at least one electronic component configured to be adjusted based on the at least one value of the at least one antenna system parameter. The at least one antenna system parameter may include at least one of: i) a transfer function of at least a part of the antenna system; ii) a frequency of an extreme value of the transfer function of at least a part of the antenna system; and iii) a width of a peak of the transfer function. The at least one antenna system parameter may include at least one antenna system parameter comprises at least one of: i) resonance frequency of the antenna system; ii) antenna system impedance; iii) antenna system moment; iv) antenna system inductance; v) antenna system capacitance; vi) antenna system resistance; and vii) antenna system quality factor.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
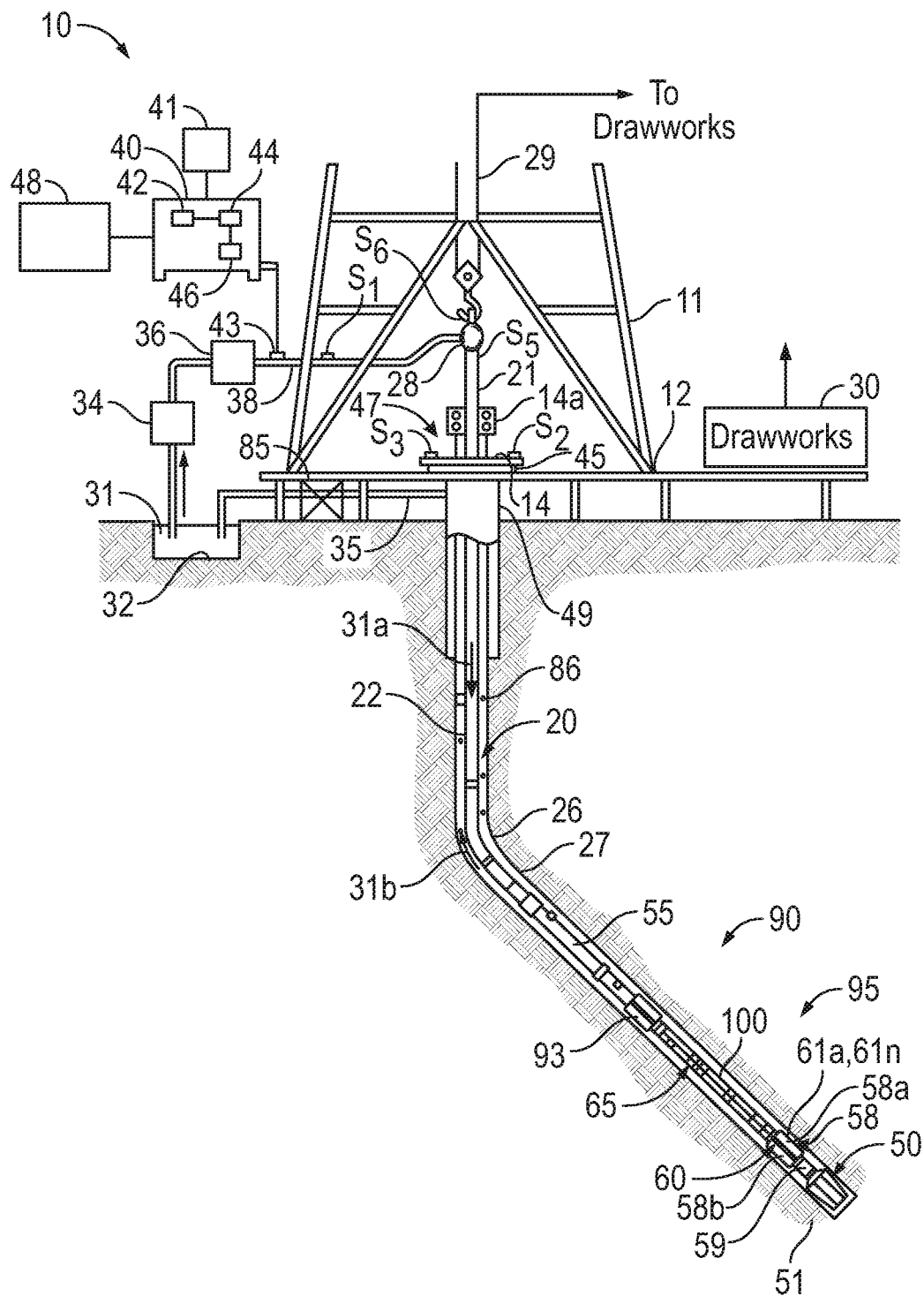
FIG. 1A shows an exemplary embodiment of a system for evaluation of an earth formation using measurements from a downhole electromagnetic tool.

This disclosure generally relates to evaluation of an earth formation, which may include exploration for hydrocarbons involving electromagnetic investigations of a borehole penetrating the earth formation. These investigations may include estimating at least one parameter of interest of the earth formation.

Aspects of the present disclosure relate to apparatus and methods for electromagnetic well logging for evaluating an earth formation. More specifically, the present disclosure relates to estimating and displaying properties of the formation relating to electromagnetic (EM) measurements. The formation may be intersected by a wellbore and the measurements may be taken in the wellbore. The EM measurements may be used to estimate the parameter of interest. Aspects of the present disclosure facilitate the display and analysis of EM measurements. Further aspects may include methods for conducting a drilling operation by estimating the parameter of interest (e.g., resistivity, conductivity, permittivity) in real-time during the drilling operation and conducting the drilling operation in dependence upon the estimate.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Downhole electromagnetic measurement tools are well known in the art. Inductive sensors are used in downhole tools, particularly in logging-while-drilling ('LWD') and measurement-while-drilling ('MWD') contexts. The basic topology often consists of one or more transmitters associated with one or more respective receivers.

Aspects of the present disclosure may include various components for performing an electromagnetic excitation including exciting currents, voltages, or electric (or magnetic) fields, generating electromagnetic waves, or other electrical phenomena in a formation surrounding a borehole, and for sensing electrical effects of the generated phenomena, such as, for example, one or more coils or electrodes. A component (e.g., a coil or a ring electrode) referred to herein as a transmitter may generate an oscillating signal in an adjacent geological formation, e.g., by supplying a square wave signal, sinusoid signal, or other oscillating signal to a coil. Any number of oscillating voltage signals having one or more waveforms, comprising one or more frequencies, may be used. It may also be desirable that, on occasion, a single-frequency signal, such as a sinusoidal signal, is used. One application for downhole measurements is formation evaluation, where the goal is to evaluate the oil content of a possible reservoir.

On the transmitter side an electromagnetic field is generated in the formation. The electrical properties of the formation are contained in the receiver response. Resistivity instruments transmit signals into a formation and receive measurement signals from the formation in cooperation with one or more antennas. Changes of the measurement signal, the measurement signal being related to and indicative of the electromagnetic fields being measured, contain information regarding properties of the surrounding formation (e.g., resistivity, conductivity, permittivity).

Those skilled in the art will understand that there are various types of measurement signals within the scope of this disclosure. As a non-limiting example, a measurement signal may be an analog voltage created in an electrode, a receiver coil, or any other type of antenna in response to an electromagnetic field in the formation. As another non-limiting example, the measurement signal may be a digital information such as a data word, representing a number that is related to the electromagnetic field in the formation. Other analog or digital information that is related to the electromagnetic field in the formation in a known manner, may also serve as measurement signals.

For instance, an electronic module comprising a sensor could be used to measure the electromagnetic field in the formation to generate analog or digital measurement signals that are related to the electromagnetic field in the formation. Measurement signals are subject to analog and/or digital processing to derive one or more parameters of interest. For instance, the analog voltage sensed by a receiver coil, electrode, or other type of antenna may be subject to one or more of amplifications, filtering, compensations, adjustments, corrections, analog-digital conversion, digital-analog conversion, and computations to calculate one or more of a resistivity, a conductivity, or a permittivity. In a similar manner, digital information related to the electromagnetic field in the formation may be subject to one or more of amplifications, filtering, compensations, adjustments, corrections, analog-digital conversion, digital-analog conversion and computations to calculate one or more of a resistivity, a conductivity, or a permittivity.

Therefore, the antenna, such as, for example, a receiving coil, an electrode, or any other type of sensor capable of sensing electromagnetic fields or potentials, may be connected to electric, electronic and/or mechanic components to form the antenna system. However, changes of parameters of the antenna system (the 'antenna system parameters', e.g., electrical properties affecting performance) also affect the received signal, and may lead to a measurement signal change that could be misinterpreted as indicative of the formation. For some instruments, the sensitivity of the receiver antenna may be characterized by antenna moment, inductance and/or the Quality Factor. A differential measurement signal may be affected negatively if the antenna system parameter were changed by influences such as environmental differences (e.g., temperature), wear, or damage, especially if the influences vary between antennas. For example, during drilling, the antenna impedance may change due to the formation, drilling mud, or changes in the tool itself, such as broken ferrite components of antenna cores or wear of a shielding.

Aspects of the present disclosure include determining antenna system parameters in a given antenna system using an internal electrical system of the tool. To compensate for or monitor these changes, the antenna system parameters may ideally be measured during drilling operations. Aspects of the present disclosure include estimating a first value of the antenna system parameter and a second value of the antenna system parameter by feeding a calibration signal into a signal path of the logging tool, the signal path including at least a part of the antenna system; and performing further logging operations in dependence upon the first value of the antenna system parameter and the second value of the antenna system parameter. In one preferred embodiment, the calibration signal may bypass the formation at least to some extent. However, this is not a requirement. In other embodiments, a significant part of the signal path of the calibration signal may comprise the formation in addition to the antenna system. The signal path may or may not comprise also parts of the mud or other parts of the tool.

In embodiments, to compensate for or monitor these changes, a distinction between the first value and the second value is identified. The identification of the distinction may utilize differences, ratios or other relationships between the first and second value that are suitable to identify and characterize distinctions between a first and a second value. The utilization of the relationships may be carried out employing digital means or analog means, such as, for example, superpositions of electric fields, magnetic field, voltages, or the like. The first value may be a value of the antenna system parameter at a first time, and the second value may be a value of the antenna system parameter at a second time. The first value may be associated with a first measurement representative of the parameter of interest around the first time. The second value may be associated with a second measurement representative of the parameter of interest around the second time (e.g., measurements taken shortly before or after the second time). Alternatively, or in addition, the first value may be a value of the antenna system parameter at a first frequency of the calibration signal, and the second value may be a value of the antenna system parameter at a second frequency of the calibration signal. The one or more frequencies of the calibration signal may or may not be identical with the frequency of the measurement signal.

The antenna system resonance frequency may be approximated as a function of the antenna system inductance and capacitance. The determination of the resonance frequency of the antenna system may be used to identify changes in an antenna system parameter like antenna system inductance or the antenna system quality factor (QF). As one example, at resonance frequency, the measured signal would show a sharp peak versus the frequency that can be used to identify the resonance frequency of the antenna system.

On many propagation resistivity tools, the resonance frequency may be determined by sweeping the frequency of an internal calibration signal and measuring the signal level in response of this calibration signal. The internal calibration signal may be fed into a signal path of the tool including the antenna system. Tools or antenna systems may include a matching network to focus the antenna system character around a desired frequency band for measurement. Only at those frequencies does the antenna have optimal matching with the typical character of the receiver antenna system. If the antenna system character is changed, the antenna is sub-optimally matched and the received signal (resulting from the calibration signal or the signal transmitted by the transmitter) is attenuated.

Alternatively, using the transfer function of the matching network, the relationship between the antenna system parameters (e.g. antenna system impedance, antenna system moment, antenna system inductance, antenna system capacitance, antenna system resistance, antenna system quality factor) and the frequencies may be estimated. By sweeping the frequencies of transmitter signal, a receiver signal may be determined from the corresponding measurements and the antenna system parameter can be determined using the derivation of the transfer function of the matching network. This calculated antenna system parameter may be used to adjust or otherwise correct the received signal during drilling.

FIG. 1A shows an exemplary embodiment of a system for evaluation of an earth formation using measurements from a downhole electromagnetic tool. The system 10 includes a carrier (i.e., drill string 20) that is shown disposed in a wellbore or borehole 26 that penetrates at least one earth formation 95. The system 10 also includes a tool 100 configured for taking electromagnetic measurements in the borehole.

As described herein, "borehole" or "wellbore" refers to a single hole that makes up all or part of a drilled well. Depending on the configuration, the system 10 may be used during drilling and/or after the borehole 26 has been formed. While a land system is shown, the teachings of the present disclosure may also be utilized in offshore or subsea applications. As described herein, "formations" refer to the various features and materials that may be encountered in a subsurface environment and surround the borehole. The term "information" includes, but is not limited to, raw data, processed data, and signals.

FIG. 1A shows a drill string 20 including a bottomhole assembly (BHA) 90 conveyed in the borehole 26 as the carrier. The drilling system 10 includes a derrick 11 erected on a platform or floor 12 which supports a rotary table 14 that is rotated by a prime mover, such as an electric motor (not shown), at a desired rotational speed. A tubing (such as jointed drill pipe 22), having the BHA 90, attached at its bottom end extends from the surface to the bottom 51 of the borehole 26. A drill bit 50, attached to BHA 90, disintegrates the geological formations when it is rotated to drill the borehole 26. The drill string 20 is coupled to a drawworks 30 via a Kelly joint 21, swivel 28 and line 29 through a pulley. Drawworks 30 is operated to control the weight on bit ("WOB") and/or rate of penetration ("ROP"). The drill string 20 may be rotated by a top drive (not shown) instead of by the prime mover and the rotary table 14. Alternatively, a coiled-tubing may be used instead of or in addition to the jointed drill pipe 22. A tubing injector may be used to convey the coiled-tubing having the BHA 90 attached to its bottom end. The operations of the drawworks 30 and the tubing injector are known in the art and are thus not described in detail herein.

It should be understood that embodiments of the present disclosure are well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc.) refer to the direction of travel along the borehole either toward or away from the surface, with the upward direction being toward the surface and the downward direction being away from the surface.

A suitable drilling fluid 31 (also referred to as the "mud") from a source 32 thereof, such as a mud pit, is circulated under pressure through the drill string 20 by a mud pump 34. The drilling fluid 31 passes from the mud pump 34 into the drill string 20 via a desurger 36 and the fluid line 38. The drilling fluid 31a from the drilling tubular discharges at the borehole bottom 51 through openings in the drill bit 50. The returning drilling fluid 31b circulates uphole through the annular space 27 between the drill string 20 and the borehole 26 and returns to the mud pit 32 via a return line 35 and drill cutting screen 85 that removes the drill cuttings 86 from the returning drilling fluid 31b. In some applications, the drill bit 50 is rotated by only rotating the drill pipe 22. However, in many other applications, a downhole motor 55 (mud motor) disposed in the BHA 90 also rotates the drill bit 50.

A surface control unit or controller 40 receives signals from the downhole sensors and devices via a sensor 43 placed in the fluid line 38 and signals from sensors S1-S6 and other sensors used in the drilling system 10 and processes such signals according to programmed instructions provided to the surface control unit 40. The surface control unit 40 may display desired drilling parameters and other information on a display/monitor 41 that is utilized by an operator to control the drilling operations. The surface control unit 40 may be a computer-based unit that may include a processor 42 (such as a microprocessor), a storage device 44, such as a solid-state memory, tape or hard disc and other storage devices known to one of ordinary skill in the art, and one or more computer programs 46 in the storage device 44 that are accessible to the processor 42 for executing instructions contained in such programs. The surface control unit 40 may further communicate with a remote control unit 48. The surface control unit 40 may process data relating to the drilling operations, data from the sensors and devices on the surface, and data received from downhole; and may control one or more operations of the downhole and surface devices. The data may be transmitted in analog or digital form.

The BHA 90 may include a tool 100 configured for performing electromagnetic (EM) measurements. The BHA 90 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 95 surrounding the BHA 90. For convenience, all such sensors are generally denoted herein by numeral 65. The BHA 90 may further include a variety of other sensors and devices 59 for determining one or more dynamic properties of the BHA 90, such as vibration, bending moment, acceleration, oscillations, whirl, stick-slip, weight-on-bit, fluid flow rate, pressure, temperature, rate of penetration, azimuth, tool face, drill bit rotation, etc.

The BHA 90 may include a steering apparatus or tool 58 for steering the drill bit 50 along a desired drilling path. In one aspect, the steering apparatus may include a steering unit 60, having a number of force application members 61a-61n. The force application members may be mounted directly on the drill string, on a steering tool or they may be at least partially integrated into the downhole motor 55. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 58 having a bent sub and a first steering device 58a to orient the bent sub in the wellbore and the second steering device 58b to maintain the bent sub along a selected drilling direction. The steering unit 58, 60 may include near-bit inclinometers and magnetometers. Many current drilling systems, especially for drilling highly deviated and horizontal wellbores, utilize coiled-tubing for conveying the drilling assembly downhole. In such applications a thruster may be deployed in the drill string 20 to provide the required force on the drill bit. Those skilled in the art will appreciate that there are many other options to steer the BHA downhole known in the art.

Figure 1B:
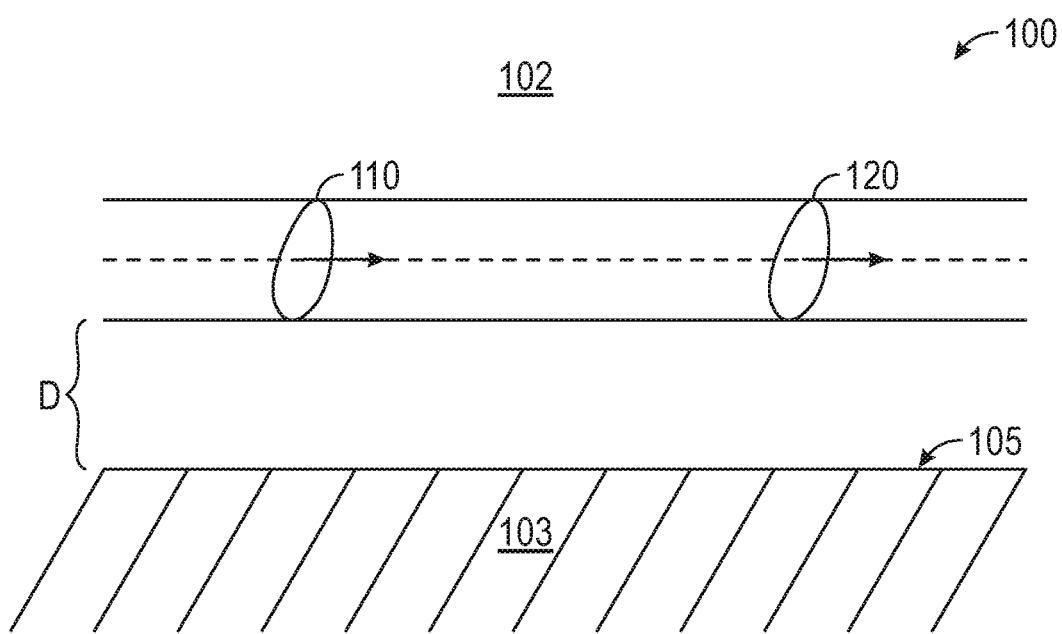
FIG. 1B illustrates an EM tool in a subterranean environment in accordance with embodiments of the present disclosure.

The drilling system 10 can include one or more downhole processors at a suitable location such as 93 on the BHA 90. The processor(s) can be a microprocessor that uses a computer program implemented on a suitable non-transitory or non-volatile computer-readable medium that enables the processor to perform the control of drilling system 10 and processing of information, such as information from the sensors. The non-transitory or non-volatile computer-readable medium may include one or more ROMs, EPROMs, EAROMs, EEPROMs, flash memories, RAMs, hard drives and/or optical disks. Other equipment such as power and data buses, power supplies, and the like will be apparent to one skilled in the art. In one embodiment, the MWD system utilizes mud pulse telemetry to communicate data from a downhole location to the surface or vice versa while drilling operations take place. Alternatively, the MWD system may use acoustic telemetry, electromagnetic telemetry, telemetry via electric conduit such as wired pipe, and so on. Various power and/or communication signals may be transmitted through the pipe segments via a "wired pipe" configuration. Such configurations include electrical, optical or other conductors extending along the length of selected pipe segments. The conductors are operably connected between pipe segments by a variety of connecting configurations such as but not limited to inductive coupling, electromagnetic coupling, resonance coupling, galvanic coupling, and optical coupling. The surface processor 42 can process the surface measured data, along with the data transmitted from the downhole processor, to evaluate the formation. A point of novelty of the system illustrated in FIGS. 1A & 1B is that the surface processor 42 and/or the downhole processor 93 are configured to perform certain methods (discussed below) that are not in the prior art. Surface processor 42 or downhole processor 93 may be configured to send instructions to steering apparatus 58, mud pump 34, drawworks 30, rotary table 14, downhole motor 55, other components of the BHA 90, or other components of the drilling system 10. Surface processor 42 or downhole processor 93 may be configured to receive data from or send instructions to sensors described above and to correct or otherwise process data from the sensors to estimate a parameter of interest according to methods described herein.

Control of these components may be carried out using one or more models using methods described below. For example, surface processor 42 or downhole processor 93 may be configured to modify drilling operations i) autonomously upon triggering conditions, ii) in response to operator commands, or iii) combinations of these. Such modifications may include changing drilling parameters, steering the drillbit 50 (e.g., geosteering), and so on. Control of these devices, and of the various processes of the drilling system generally, may be carried out in a completely automated fashion or through interaction with personnel via notifications, graphical representations, user interfaces such as display 41, and the like. Reference information accessible to the processor may also be used. In some general embodiments, surface processor 42, downhole processor 93, or other processors (e.g. remote processors) may be configured to operate the EM tool 100 to excite and measure EM signals.

The system 10 may include any number of downhole tools for various processes including formation drilling, geosteering, and formation evaluation (FE) for measuring versus depth and/or time one or more physical quantities in or around a borehole. The tool 100 may be included in or embodied as a BHA, drillstring component or other suitable carrier.

While a drill string 20 is shown as a conveyance device for tool 100, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 10 may include a bottomhole assembly and/or sensors and equipment for implementation of embodiments of the present disclosure on either a drill string or a wireline. "Carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carriers include, but are not limited to, casing pipes, wirelines, wireline sondes, slickline sondes, drop shots, downhole subs, bottom-hole assemblies, and drill strings.

Mathematical models, look-up tables, or other models representing relationships between the signals and the values of the formation properties may be used to characterize operations in the formation or the formation itself, optimize one or more operational parameters such as of the drilling process, a measurement, a production or development, and so on. The drilling system 10 may carry out these actions through notifications, advice, and/or intelligent control.

Various types of electrical sensors may be used in evaluating the formation in accordance with embodiments disclosed herein. As one example, sensors that are based on electromagnetic (EM) wave propagation are used for many applications where amplitude and phase of waves traveled in an unknown medium are studied to infer the properties of that medium. Although aspects of the disclosure may be particularly useful in addressing challenges associated with (EM) wave propagation, particular embodiments may employ the techniques disclosed herein in connection with various types of induction logging, including multi-component induction logging.

FIG. 1B illustrates an EM tool 100 in a subterranean environment in accordance with embodiments of the present disclosure. The tool 100 may be disposed next to a formation boundary 105 or other interface and may include a transmitter assembly 110 and a receiver assembly 120 disposed along drillstring 20. Other embodiments may include additional transmitter or receiver assemblies. The transmitter assembly 110 may be configured to excite electromagnetic phenomena in the formation. For example, the transmitter assembly 110 may include a sensor coil or an electrode coupled with a transmitter, which is connected to a current source. The receiver assembly 120 may be configured to convert an electromagnetic signal received at a sensor coil responsive to the phenomena into an output signal.

Transmitter and receiver lie along a common axis 101 that is horizontally positioned in the upper half-space 102 parallel to the formation boundary and is separated by a distance d from said boundary. The upper half-space 102 has a resistivity of 50 Ohm–m and the remote formation (lower half-space) 103 has a resistivity of 2 Ohm–m. Responses of the transmitter-receiver assembly operated in the presence of a remote plane boundary exhibit known characteristics. The responses may depend significantly on the distance to the boundary 105. Model responses may be used to estimate the distance to the boundary.

Many variations in transmitter and receiver assembly configurations may be successfully employed. Transmitter and receiver assemblies may vary in number, location (e.g., with respect to the tool, to one another, to the drill bit, and so on) and orientation (e.g., transverse, longitudinal, tilted, etc.). Some embodiments may include bucking coils or other bucking components. Various sensor arrays of differing types may be placed on the BHA, a number of subs on the drill string, or various combinations of these. As one example, the techniques of the present disclosure are amenable for use with the DeepTrak™ tool or the AziTrak™ tool, both provided by BAKER HUGHES INCORPORATED.

As non-limiting examples, each transmitter or receiver assembly of the logging tools herein may comprise a loop antenna, a coil antenna, a monopole antenna, a dipole antenna, an antenna array, a patch antenna, a reflector antenna, a log-periodic antenna, a ring electrode, directional electrode arrays, and so on, including combinations of the above. Each transmitter or receiver assembly may be configured to operate at one or more frequencies. Each transmitter or receiver assembly may be configured to operate with a transient signal that corresponds to a sum of finite or infinite number of single frequency signals. The relationship between the transient signal and the sum of single frequency signals is known as Fourier series. Each transmitter or receiver assembly may be configured to have a limited frequency range and may be tuned to discrete frequencies.

In operation, tool 100 is configured to effect changes in the transmitter assembly 110 to generate an electromagnetic excitation in the formation at at least one frequency. Signals occur in the sensor of the receiver assembly 120 responsive to the EM excitation. The signal contains information about formation characteristics. Thus, the receiver assembly 120 produces a response indicative of formation characteristics, such as the parameter of interest. A processor is configured to measure signals.

It should be noted that the coaxial transmitter assembly-receiver assembly configuration shown herein is not to be construed as a limitation and any suitable arrangement including but not limited to an arrangement having a transverse transmitter and/or a transverse receiver may be used.

To determine the resonance frequency of the receiver assembly 120 signal path including the antenna a signal source with a variable frequency is needed. This signal source can be controlled by a microprocessor or digital signal processor that may be part of the data acquisition and signal processing unit.

This calibration signal may comprise at least two calibration subsignals. The calibration subsignals have different frequencies. The calibration subsignals may also have different amplitudes and/or phases. In some instances, more than two calibration subsignals may be used, and it may be beneficial to use as many calibration subsignals as possible. It may be beneficial to send the signals consecutively. The frequency, amplitude, or phase could be varied in an analogue way, but techniques herein may also use several discrete frequencies. Furthermore, the signals do not need to be transmitted consecutively but could also be sent at the same time (including simultaneously), e.g., a signal that is a sum of various signals having different frequencies (e.g., a Fourier series).

The calibration signal generated by the signal source is fed into the receiver assembly signal path back to the data acquisition and signal processing unit. The antenna that is to be measured may be part of this signal path. Alternatively, the signal part may exclude the antenna. The same signal source generating the calibration signal can be used to determine the transfer function at the frequency used for the formation resistivity measurements to correct for disturbing influences, e.g. temperature, wear, etc., in these signal paths.

These calibration signals can be transmitted during, before, or after the normal measurement cycle of the antenna system, although in some applications it may be preferable to measure the resonance frequency when the antenna system is in an idle mode or when no measurements are taken, to avoid interference with normal operation. A corresponding time period could be the start-up phase of the entire downhole system or any other idle times, when a normal system operation is suppressed (e.g. to save energy). It is also possible to give the calibration signal a distinct pattern (time-wise, frequency-wise, amplitude-wise, or phase-wise) to allow the data acquisition and signal processing to distinguish between the measurement and calibration signals. In this case, the acquisition and/or processing of the calibration signals can be executed during the normal operation or in intermittent cycles.

Figure 2A:
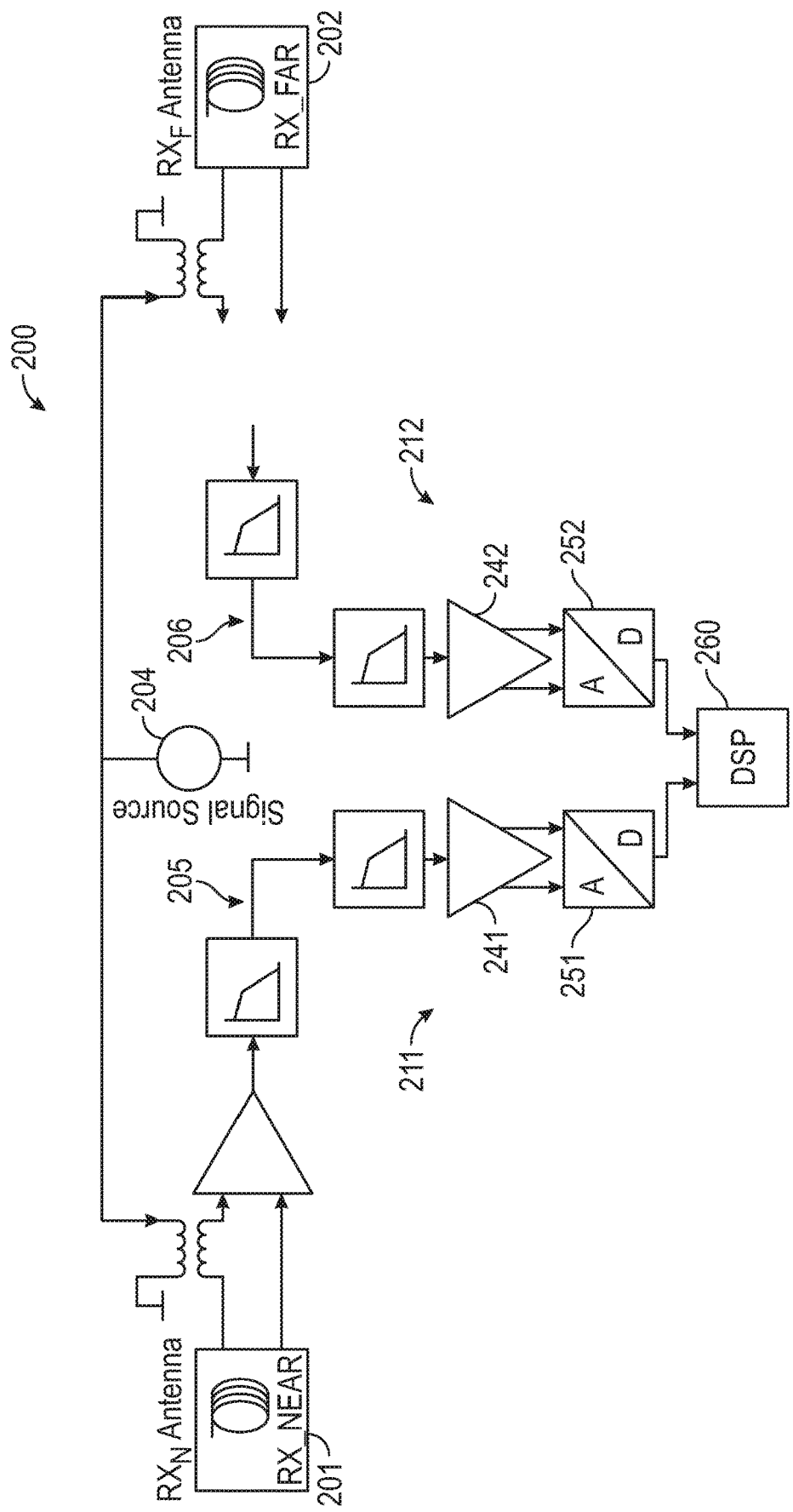
FIG. 2A depicts an electrical schematic of a receiver assembly which forms part of the antenna system of the tool.

FIG. 2A depicts an electrical schematic of a receiver assembly 200 which forms part of the antenna system of the tool. In the non-limiting example of FIG. 2A, the receiver assembly 200 includes a near antenna 201 and a far antenna 202 implemented as sensor coils operatively connected to signal paths 211 and 212. Signal paths 211 and 212 may each include a load matching network 205, 206, or other suitable digital or analog electronic components such as active or passive components, including for example, amplifiers, filters, analog-digital converter, digital-analog converter, signal processor, microcontroller, capacitors, inductances, resistances, transformers (e.g. balun transformers), and the like, between the receiver assembly and the sensor coil. The impedance matching network may be designed to match a part of the measurement signal path comprising the elements described above/e.g. the coil) to a characteristic impedance of some or all components of the receiver assembly 200.

While in FIG. 2A, specific components are shown to be included in the signal path, it is clear for those skilled in the art, that the signal path may be defined by including or excluding components apart from what is shown in FIG. 2A. In particular, the signal path for the calibration signal may not be identical to the path of the measurement signal, may comprise only parts of the path of the measurement signal or may be a totally different from the path of the measurement signal. The tool may be configured for induction logging (e.g., based on standing waves and generally less than 100 kHz), multi-array wave propagation logging (e.g., 100 kHz to 10 GHz), and so on as known in the art. Receiver assembly 200 may comprise a data acquisition and signal processing unit including operational amplifiers 241, 242, analog-to-digital converter circuitry 251, 252 and digital signal processor (DSP) 260. Receiver assembly 200 may also include filters, passive components, and other digital components such as digital to analog converters ('DAC') as would occur to those of skill in the art. In accordance with particular embodiments, the antenna system may include any or all of the components of the receiver assembly 200.

Although FIG. 2A illustrates embodiments utilizing a near receiving antenna and a far receiving antenna, other embodiments may include only a single receiving antenna, multiple antennas or arrays of antennas in various configurations, or antennas which may be switchably selected for either transmitting or receiving or both, and particular configuration of such embodiments suitable to the present disclosure will be implemented in accordance with techniques well known to those of skill in the art.

Figure 2B:
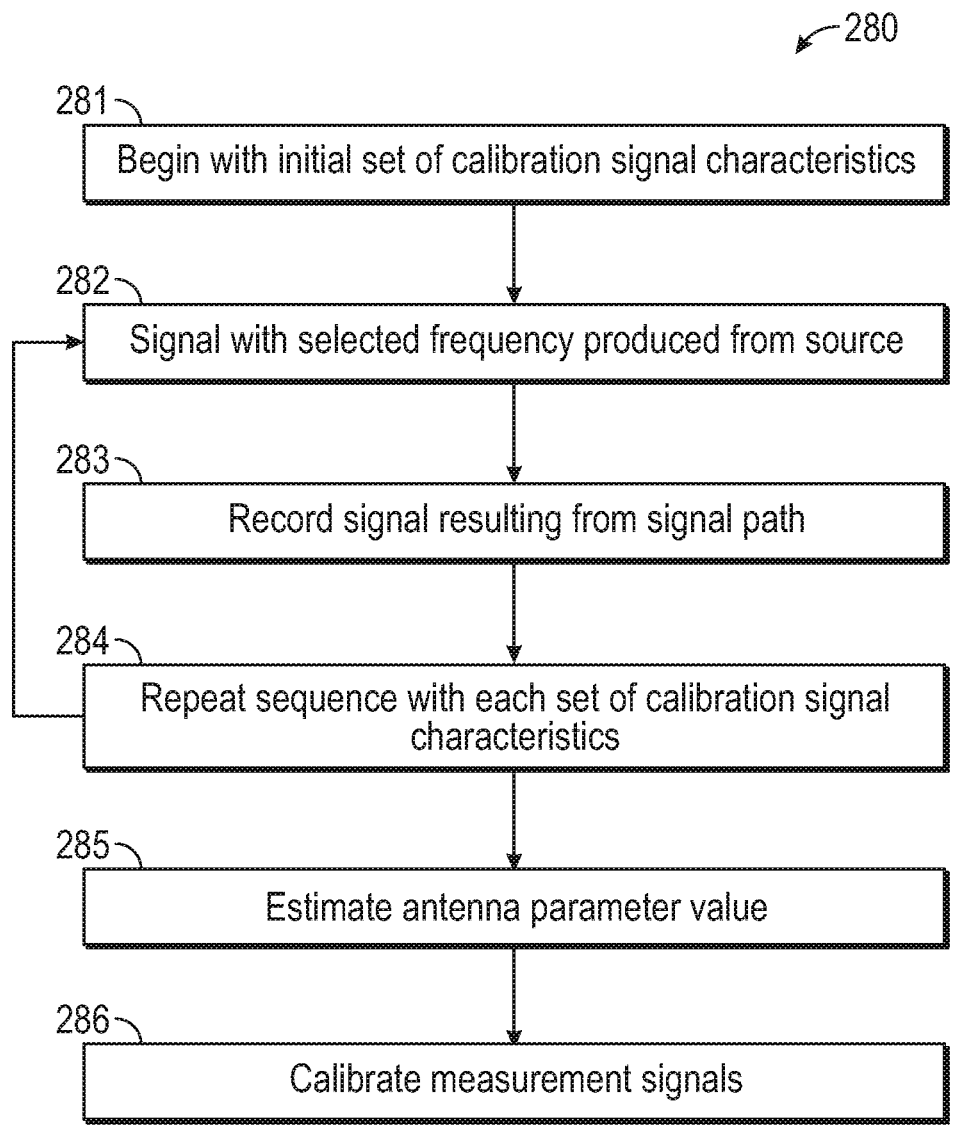
FIG. 2B show a flow chart illustrating methods in accordance with embodiments of the disclosure.

FIG. 2B show a flow chart illustrating methods in accordance with embodiments of the disclosure. Methods 280 relate to detecting and correlating resulting signals from a calibration signal over a range of calibration signal characteristics, such as a range of frequencies. That is, when calibration data having a first set of characteristics is acquired and processed, one or more characteristics of the calibration signal (e.g., frequency, amplitude, phase) from the signal source may be changed. For example, methods 280 in accordance with FIG. 2B may perform a frequency sweep to identify at least one of a transfer function, an extreme value of the transfer function, a resonance frequency, a width of a peak of the transfer function, of the system or a part of the system. At step 281, the process begins with an initial set of controlled calibration signal characteristics. For example, a frequency sweep begins with an initial frequency. The frequency is produced on a signal source at step 282. In some embodiments, the microprocessor on the data acquisition and signal processing unit (or other circuitry, such as, for example, downhole processor 93) will setup the frequency on the signal source 204 to a specific frequency as a starting point. This signal source 204 may provide only the calibration signal. However, in other implementations, signal source 204 may provide both the measurement signal to the transmitter (not shown) as well as the calibration signal to one or more receiver. At step 283, the DSP 260 will record a resulting signal from the receiver assembly signal paths (such as signal paths 211 and 212 in FIG. 2A) at this specific set of characteristics (e.g., frequency).

At step 284, this sequence may be repeated over the entire selected range of calibration subsignal characteristics. Step 284 comprises varying characteristics of the calibration signal—that is, changing from one calibration subsignal to another calibration subsignal—for additional calibration measurements. In the case of changing frequency, the specific frequency values as well as the step size for the frequency changes may be aligned to the restriction given by the applied signal processing methods. These step sizes may remain constant or vary from frequency level to frequency level. Frequency may also be varied continuously (e.g., via analog systems). The signal level, parameter values, or antenna parameter values for each new specific frequency (or a sampling of the continuous frequencies) may then again be determined from the received signal. In the case that the frequency is the characteristic that is varied, the range of chosen frequencies may correspond with the frequency range dictated by tool specifications, or may correspond to the range of expected resonance frequencies according to any a priori knowledge of the antenna system. This may include iteratively repeating measurements at different frequencies by increasing the frequency by defined step size (or continuously) until outside the selected frequency range.

At step 285, a value of at least one antenna system parameter may be estimated. At step 285, from the recorded data, the signal processor 260 may determine the signal level and other parameter values of the measured calibration signal and derive one or more antenna parameter values from the recorded data.

Possible antenna system parameters include: a transfer function of at least a part of the antenna system; a frequency of an extreme value of the transfer function of at least a part of the antenna system; a width of a peak of the transfer function; a resonance frequency of the antenna system; an antenna system impedance; a frequency response obtained from the resultant signal; an antenna system moment; an antenna system inductance; an antenna system capacitance; an antenna system resistance; and an antenna system quality factor. The analysis of the gathered signal levels (or other parameter) will show a larger change at or close to the resonance frequency of the antenna system, including the electronics in at least a part of a receiver assembly path that may include the antenna.

The resonance frequency is mostly determined by the impedance (inductance, capacitance, and resistance) of the antenna system. Assuming that the influence of the electronics can be considered constant or compensated, a detected change on the resonance frequency is a result of a change in the antenna system parameter.

The resonance frequency may be far from the frequencies used for the measurements, which is typical. The electronics of the signal path may then be designed to process or transfer the signals in the frequency range of the measurement. Signals in the frequency range of the resonance frequency are usually considered as unwanted noise or interferences. The electronics of the signal path may be designed to process or transfer the signals in the frequency range of the measurement, while signals in the frequency range of the resonance frequency may be treated as noise or interference and may be suppressed by filter stages in this signal path.

In some instances, the stopband attenuation of the filters may be sufficiently high that signals in the resonance frequency range are not detectable. If the stopband attenuation of these filters is so high that signals in the resonance frequency range are not detectable then these filter stages may be deactivated for the time period when the resonance frequency will be determined. In such implementations, the filter stages may be deactivated or circumvented during determination of the resonance frequency. For these implementations, a continuous measurement of the resonance frequency may be challenging. If the signals are detectable without changes in the signal path, then the measured signal levels or other parameters may be corrected by a known (a priori) transfer function to measure the resonance frequency or to detect a change of this frequency or to adjust for filtering.

At step 286, the change in the antenna parameter value may be correlated with a change in the antenna system and/or used to calibrate (or correct) the measurement signals. These results can be used to correct the measurements for changes on the antenna system or at least to monitor the function of the antenna system. They can also be used to adjust the transmitter frequency in order to maintain the desired level in the transfer function, e.g. to maintain the frequency at the resonance frequency.

Techniques in accordance with the present disclosure enable the downhole system to correct the measurement readings or to adjust measurement system parameters (e.g., tool operational parameters) to compensate for the change in antenna system parameter.

Parameter changes can be transmitted to the surface via mud pulse telemetry or any other telemetry method known in the art, such as, for example, electromagnetic telemetry, acoustic telemetry, telemetry by electric conduit (e.g., wired pipe), and so on. Parameter changes can also be stored to a downhole memory for analysis after the tool is tripped back to surface. Later analysis may be used to correct raw measurements to avoid measurement errors (and a resulting misinterpretation of the formation) caused by changes of antenna system parameter.

If the antenna system parameter is antenna system impedance, changes in impedance may result in a mismatch between the antenna and the matching network, resulting in suboptimal conversion. As a result, the received signal is significantly attenuated from the optimal performance. Using the transfer function of the matching network, the relationship between the impedance and frequency can be determined. By sweeping the frequencies of the calibration signal, a maximum receiver signal can be measured and the impedance of the antenna can be calculated using the derived transfer function of the matching network. This calculated impedance, in turn, can be used to correct the received measurement signals during drilling. A peak width of the transfer function may also be determined by finding the distance of two values in the transfer function frequency-wise where the value of the transfer function corresponds to a pre-determined percentage of the maximum value of the transfer function.

In particular embodiments of the present disclosure, the tool 100 may be an EM wave propagation resistivity tool. The tool may function by measuring the attenuation and phase shift between a transmitted and received signal. The measurement may be done at one or more defined frequencies. On the receiver assembly side, the tool 100 may use a matching network—essentially a filter configured to gain the signal at the measuring frequencies and attenuate all signals with other frequencies. "Matching" refers to the fact that in electrical cooperation with the antenna, the matching network only allows defined measuring frequencies to reach the receiver.

Figure 3:
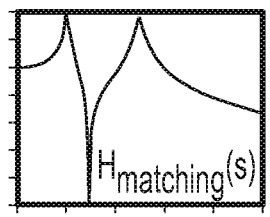
FIG. 3 represents a graphical depiction of the transfer function based on the matching network in accordance with embodiments of the present disclosure.
Figure 4A:
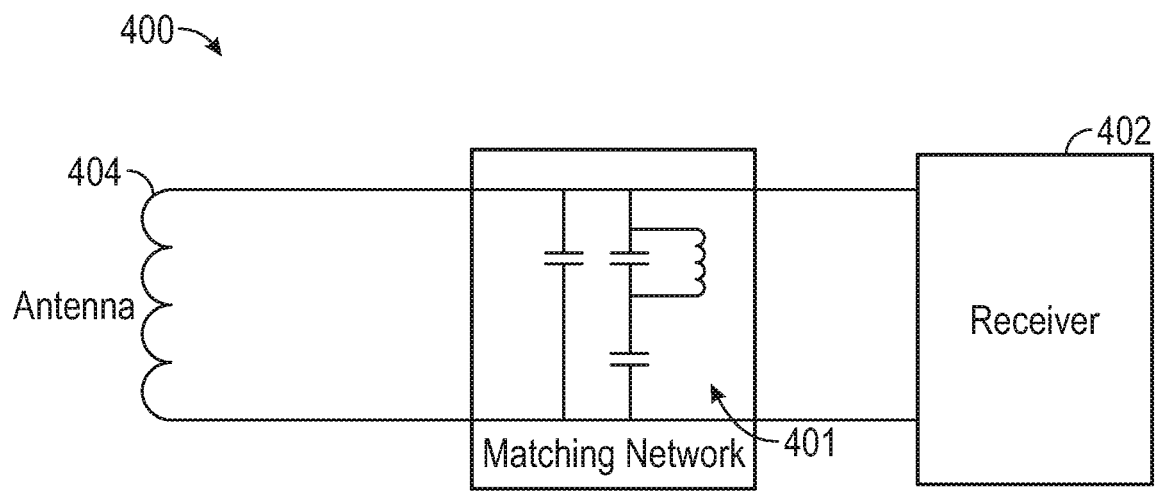
FIGS. 4A & 4B depict an electrical schematic of a system comprising a matching network between an induction antenna and a receiver in accordance with embodiments of the present disclosure.
Figure 4B:
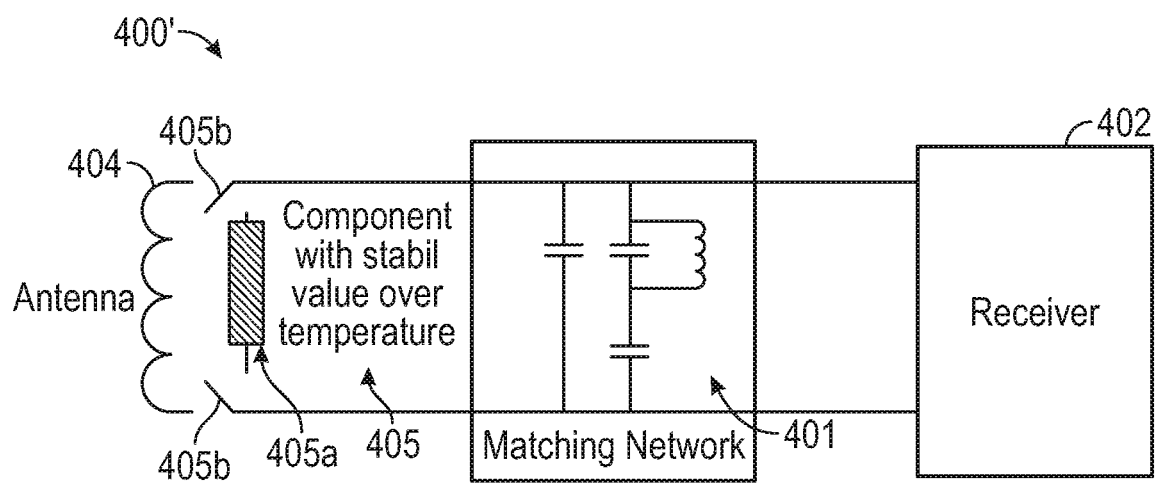

FIG. 3 represents a graphical depiction of the transfer function based on the matching network in accordance with embodiments of the present disclosure. FIGS. 4A & 4B depict an electrical schematic of a system 400 comprising a matching network 401 between an induction antenna 404 and a receiver 402 in accordance with embodiments of the present disclosure.

Although the antenna system may be a complex system, at the measuring frequencies, the antenna system can be modeled as a simple electrical device—an inductor with internal resistance—for purposes of configuring the matching network. This simulated inductor has a special characteristic: that its impedance and resistance is a function of frequency. In addition, the impedance also changes in dependence upon external conditions such as, for example, parameters of the mud, formation, and so on.

The matching network is configured for the defined impedance of the modeled antenna, which is a function of the frequencies but without all other influences. As a result, downhole (where the impedance is different as the one using for design the matching network), the signal is attenuated. If the influence of all other factors is relatively small, the signal is still in the gain edge of the transfer function.

So with the help of the matching network, a signal with defined frequencies and defined impedance of antenna is filtered to further processing. On the other side, the transfer function of the combination antenna-matching network ($H_{matching}$) changes with the change of antenna impedance. Once the transfer function is determined, the impedance can be recalculated. With this value, the antenna system can predict formation boundaries, determine formation or fluid properties, or use the information to compensate for the antenna system changes (e.g., in the case of a defective antenna system). Because impedance changes may be indicative of wear or damage to the antenna, the information of antenna impedance changes may also be logged for tool diagnostics.

Calculating the impedance may be carried out using the transfer function of the matching network. The transfer function of the matching network may be considered as a ratio of the output signal voltage ($U_{out}$) and the received signal voltage ($U_{ant}$), estimated as the ratio of the impedance of the matching network and the matching network ($Z_{ant}$) and antenna ($Z_{ant+match}$). As such, the transfer function may be considered a function of the signal along with the antenna inductance (Lant) and resistance (Rant):

$$H(s) = \frac{U_{out}}{U_{ant}} = \frac{U_{Match}}{U_{ant}} = \frac{Z_{match}}{Z_{ant} + Z_{match}} = f(s, L_{ant}, R_{ant}) \quad (1)$$

Ideally, if the antenna system measured the response of a defined source at each frequency from 0 Hz to a frequency much larger than the measuring frequencies, the transfer functions can be determined by fitting the curve to a defined function. In some cases, however, this approach would require a large number of samples at very small increments, and thus requiring an extensive amount of time to calculate.

Looking at the transfer function of the antenna-matching network combination, however, the maximum at measuring frequencies may be utilized to provide a more efficient solution. Using the fact that the derivation of a function is zero at the local or global maxima, a new equation which describes the relationship between antenna impedance, antenna resistance and frequency may be derived. From Eqn. (1), the local or global extreme may be calculated as, $$\frac{d(H(s))}{ds} = 0$$

or, by substituting $f$ for H(s)

$$\frac{df(s, L_{ant}, R_{ant})}{ds} = 0 \quad (2)$$

By sweeping a range of frequencies and identifying frequencies associated with a maximum, the frequencies of maxima may be determined. The difference of antenna resistance within a small range of frequencies is negligible. So the impedance of the antenna may be calculated using the derivative of the function $f$ at maximum frequency ($f_{max}$), which is independent of $R_{ant}$:

$$f'(s,L_{ant}|_{fmax})|_{fmax}=0. \quad (3)$$

With the known $L_{ant}|_{fmax}$, the attenuation of the matching network at measured frequencies can be calculated and used to correct the receiver signal. The left term of Eqn. 2 is a function of frequencies, antenna impedance and antenna resistance. As mentioned above, antenna impedance and resistance are also function of frequencies. But in a very small frequencies range, it may be assumed that they are constant. So they are only parameters for Eqn. 3. If the frequencies at maxima are known, Eqn. 3 may be used to calculate the impedance of the antenna with a second assumption that the resistance of the antenna remains substantially constant within the frequency range. As such, it may be assumed that any changes are attributable to changes in impedance.

Figure 5:
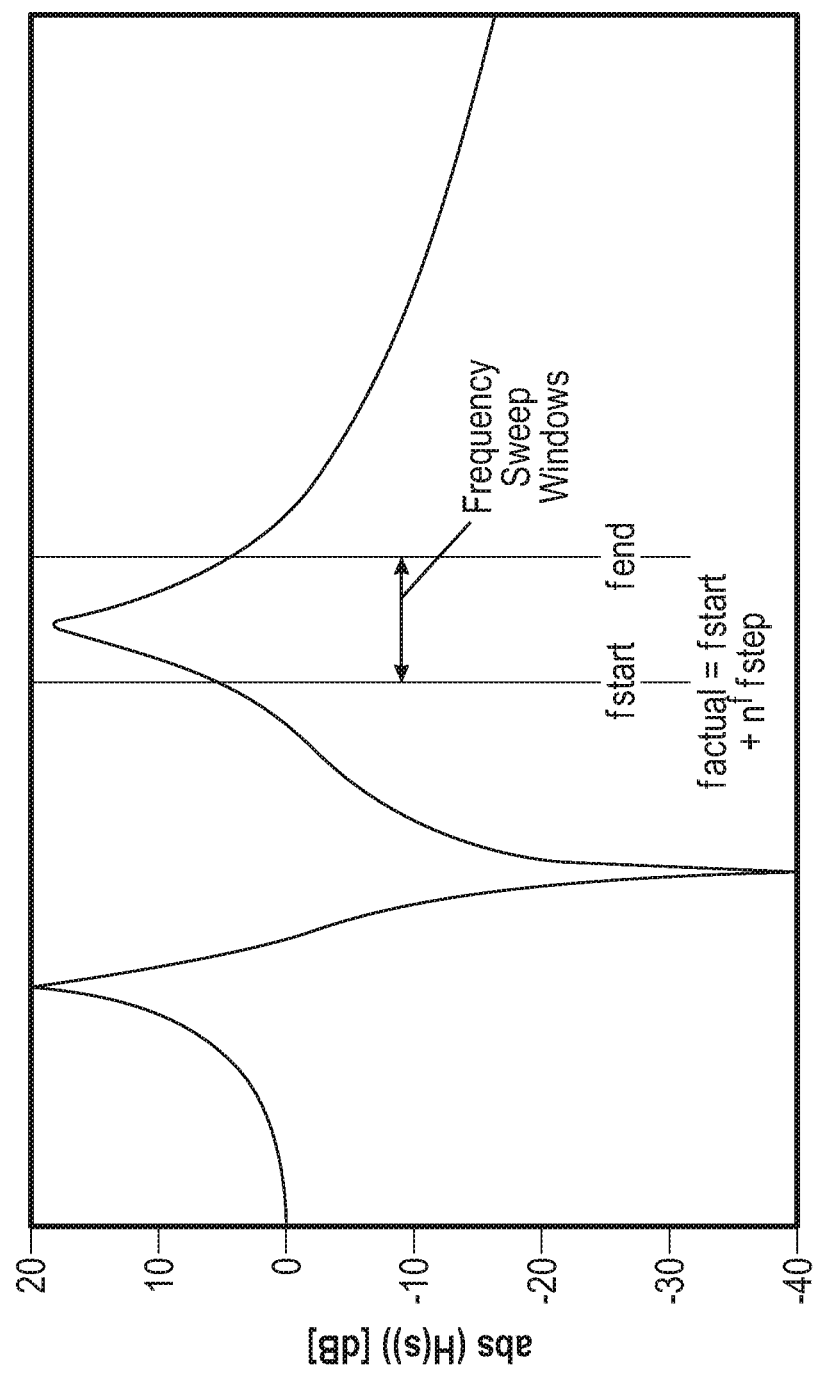
FIG. 5 illustrates techniques in accordance with embodiments of the present disclosure.

FIG. 5 illustrates techniques in accordance with embodiments of the present disclosure. The frequency at the maximum may be determined by changing the frequency with very small steps ($f_{step}$) in a small range (from $f_{start}$ to $f_{end}$) around the measurement frequencies. That is, a frequency sweep is done at the generated source and each response corresponding to a particular frequency of the sweep is measured and compared against the other responses. If the maximum is found, the sweep step can be reduced (e.g., divided) to increase accuracy. The sweep frequency window is also reduced for this step. These steps may be performed iteratively until the change of frequency between iterations falls below a statistical or absolute threshold, at which point the frequency is used as the estimated maximum frequency. In the case that the first maximum cannot be determined, the sweep windows may have to be exchanged, and the procedure redone. Note that $f_{step}$, $f_{start}$, and $f_{end}$ may be derived using the transfer function. After determining the frequency corresponding to the maximum, the frequency may be used in Eqn. 3 to calculate the $L_{ant}|_{fmax}$, or antenna impedance.

It should be noted that with the temperature changing of the matching network, the matching network accuracy also changes. In some implementations, the antenna may be replaced with another part (reference assembly 405) which has a very stable value with respect to changing temperature. The reference assembly 405 may be implemented as a bypass with a reference component 405a (e.g., a resistor, a capacitor, etc.) selectably engaged using switches 405b to activate the bypass. The response of this combination may be used to compensate the temperature effect of the matching network. The same technique may be applied to other signal filters where the transfer function may be described with the Laplace transformation.

Figure 6:
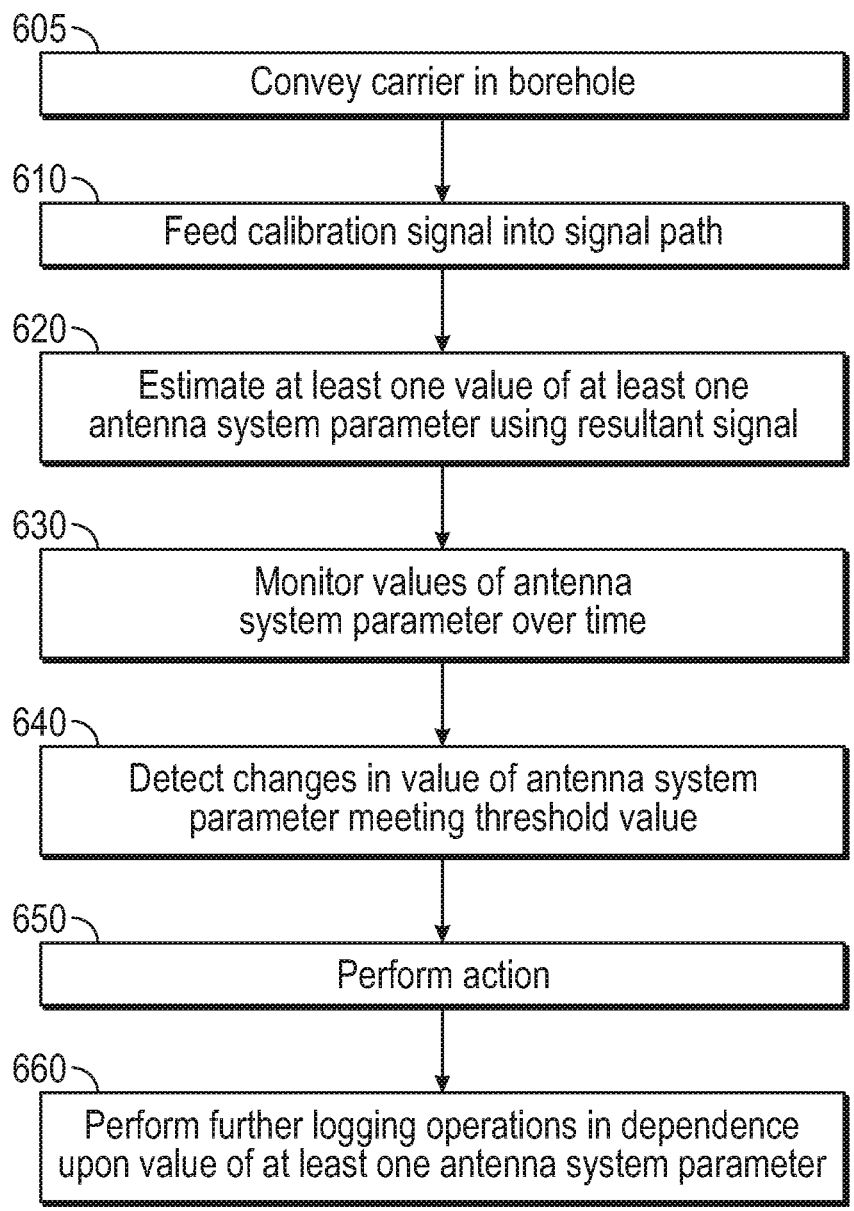
FIG. 6 illustrates methods for performing electromagnetic (EM) logging in a borehole intersecting an earth formation using a measurement signal from an antenna system on a logging tool in the borehole in accordance with embodiments of the present disclosure.

FIG. 6 illustrates methods for performing electromagnetic (EM) logging in a borehole intersecting an earth formation using a measurement signal from an antenna system on a logging tool in the borehole in accordance with embodiments of the present disclosure. The measurement signal may be dependent upon a parameter of interest of the formation and at least one antenna system parameter of the antenna system. The antenna system may include a transmitter assembly configured to transmit an excitation signal and a receiver assembly configured to receive a measurement signal.

Optional step 605 of method 600 comprises conveying a carrier into a borehole intersecting the formation. The carrier may be a component of a tool string. In some examples the carrier may be a component of a drillstring, and conveyance of the drillstring may be carried out by advancing the drillstring and extending the borehole via rotation of a drill bit.

Step 610 of method 600 comprises feeding a calibration signal into a signal path of the logging tool to generate a resultant signal. The calibration signal may include at least two calibration subsignals with a first subsignal of the at least two calibration subsignals having a first frequency and a second subsignal of the at least two calibration subsignals having a second frequency different than the first frequency. The calibration subsignals may be generated simultaneously; that is a first signal of the at least two calibration subsignals may be fed into the signal path during a period of time that overlaps with a second signal of the at least two calibration subsignals fed into the signal path (e.g., a multi-frequency signal or an overlapping signal). The calibration signal may include at least three calibration subsignals, each calibration subsignal of the at least three calibration subsignals having a unique frequency. It may be beneficial in some applications to use as many frequencies as may be practical.

Alternatively, the calibration subsignals may be generated non-simultaneously; that is, a first subsignal of the at least two calibration subsignals is fed into the signal path during a first period of time and a second subsignal of the at least two calibration subsignals is fed into the signal path during a second period of time different than the first period of time, such as consecutively sent signals (e.g., in a frequency sweep). The at least three calibration subsignals may thus form at least one swept frequency signal.

Thus, for a particular application of the calibration signal, the subsignals may be sent consecutively—the frequency may be varied continuously—although it is also possible to use several discrete frequencies; the subsignals could also be sent at the same time, leading to a signal that is a sum of various subsignals having different frequencies and amplitudes (e.g., a Fourier series). The signal path may include the antenna system or a part of the antenna system.

Step 620 of method 600 comprises estimating at least one value of the at least one antenna system parameter by using the resultant signal from feeding the calibration signal into the signal path of the logging tool. The at least one antenna system parameter may one or more of: i) a transfer function of at least a part of the antenna system; ii) a frequency of a local or global extreme value of the transfer function of at least a part of the antenna system; and iii) a width of a peak of the transfer function. The at least one antenna system parameter may include one or more of: i) resonance frequency of the antenna system; ii) antenna system impedance; iii) antenna system moment; iv) antenna system inductance; v) antenna system capacitance; vi) antenna system resistance; and vii) antenna system quality factor.

The resonance frequency could be derived by estimating a frequency of a local or global extreme value of the transfer function of at least a part of the antenna system and/or by estimating a width of a resonance peak of a transfer function. The peak width of the transfer function may be determined by finding a distance of two values in the transfer function (frequency-wise) where the value of the transfer function corresponds to a threshold percentage of the maximum value of the transfer function. The determination of the resonance frequency may be used in determining an antenna system parameter, such as inductance or the quality factor. On the tools described herein, the resonance frequency can be determined by sweeping the frequency of the internal calibration signal and to measure the signal level of this calibration signal. At resonance frequency this signal may be affected significantly.

Step 630 may include monitoring values of the antenna system parameter over time. Step 640 may include detecting changes in values of the antenna system parameter meeting a threshold value. Step 650 may include performing an action responsive to detecting antenna system parameter changes meeting the threshold value. The action may include performing at least one of: i) storing at least one of the values; ii) transmitting at least one of the values to the surface; and iii) notifying an operator of the drilling system 10.

Step 660 comprises performing further logging operations in dependence upon the at least one value of the at least one antenna system parameter and the measurement signal. Performing further logging operations may include determining a value of the parameter of interest of the formation. Performing further logging operations may include performing at least one of: i) adjustment of a measurement signal; ii) adjustment of the signal path; and iii) adjustment of an excitation signal of the logging tool. By adjusting the measurement signal a compensated (corrected) signal may be used for estimating parameters of interest. Alternatively, adjusting the excitation signal or the signal path (e.g., by adjustment of at least one of one or more electronic components of the antenna system to adjust one or more parameters of the matching network or resonant circuit), results in measurement signals characteristic of those signals corresponding to an antenna system having other antenna system parameters (e.g., lacking an offset with previous signals).

Figure 7A:
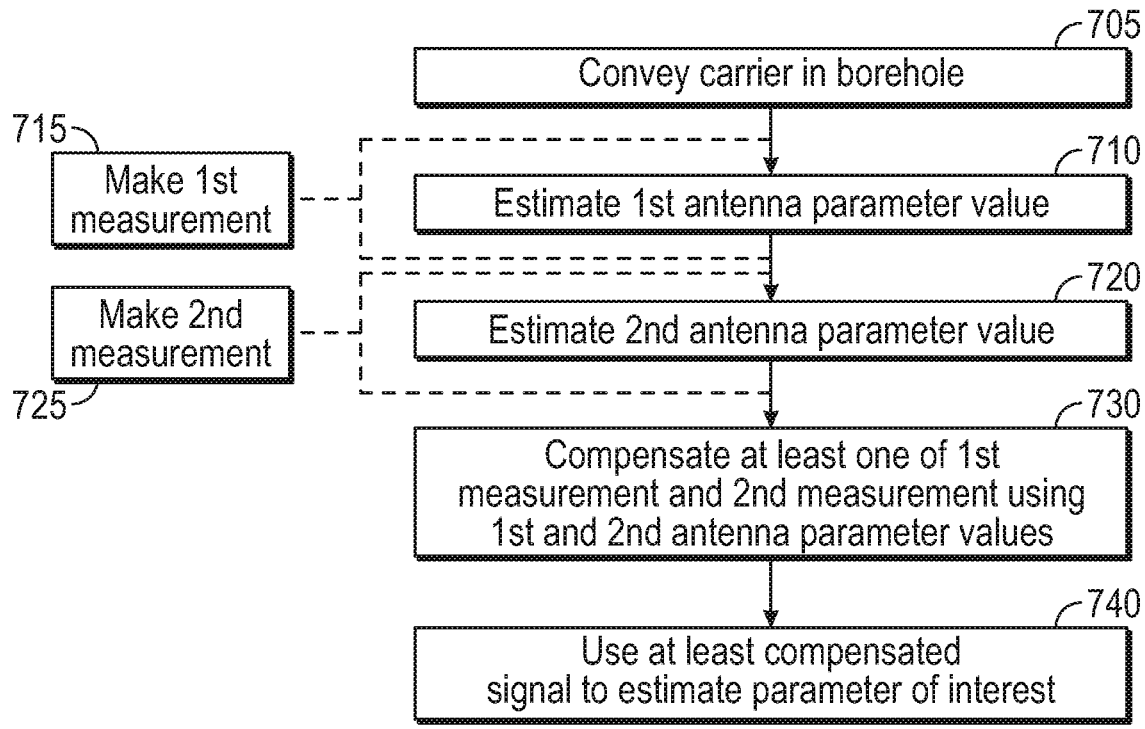
FIG. 7A illustrates methods for evaluating an earth formation intersected by a borehole in accordance with embodiments of the present disclosure.

FIG. 7A illustrates methods for evaluating an earth formation intersected by a borehole in accordance with embodiments of the present disclosure. Method 700 is a method for performing further logging operations in dependence upon changing values of the antenna system parameter. Optional step 705 of method 700 comprises conveying a carrier into a borehole intersecting the formation. The carrier may be a component of a tool string. In some examples the carrier may be a component of a drillstring, and conveyance of the drillstring may be carried out by advancing the drillstring and extending the borehole via rotation of a drill bit.

Optional step 710 comprises estimating a first value of the antenna system parameter by feeding a calibration signal into a signal path of the logging tool which bypasses the formation. The signal path includes the antenna system. Optional step 720 comprises estimating a second value of the antenna system parameter by feeding a calibration signal into the signal path of the logging tool. The first value may be a value of the antenna system parameter at a first time, and the second value may be a value of the antenna system parameter at a second time (different than the first time).

Optional step 715 comprises making a first measurement representative of the parameter of interest at at least one frequency. As one example, a propagating wave may be excited using a transmitter assembly as part of an EM tool as described above and a resulting signal received. Optional step 725 comprises making second EM measurements using the EM tool.

The first value of the antenna system parameter from step 710 may be associated with the first measurement, and may be around the first time; and the second value from step 720 may be associated with the second measurement, and may be around the second time. Thus, the first measurement may be taken before or after the estimation of the first value antenna system parameter; and the second measurement may be taken before or after the estimation of the second antenna system parameter value.

Optional step 730 comprises compensating at least one of the first measurement and the second measurement in dependence upon the first value and the second value to generate a compensated signal. Compensation may be carried out by adjusting at least one of the first measurement and the second measurement in dependence upon the difference to generate the compensated signal, or, alternatively, adjusting the antenna system in dependence upon the difference to effect changes in the second measurement to generate the compensated signal.

Step 730 may include compensating at least one of the first measurement and the second measurement in dependence upon a difference between the first value and the second value to generate a compensated signal. Thus, in embodiments, step 730 may include identifying a difference between the first value and the second value, which may be carried out by: identifying a change between a first antenna system parameter value (e.g. a first resonance frequency) associated with the first measurement and a second antenna system parameter value (e.g. a second resonance frequency) of the antenna system parameter associated with the second measurement from a resultant signal for each measurement produced responsive to the calibration signal; and using differences in signal properties for the resultant signal associated with the first resonance frequency and the second resonance frequency to estimate the difference between the first value of the antenna system parameter and the second value of the antenna system parameter. The signal properties may comprise at least one of: i) amplitude; and ii) phase. Identifying the first antenna system parameter value and the second antenna system parameter value may be carried out by performing a frequency sweep with the calibration signal over a predefined range, which may include generating a transfer function based on a resultant signal for each time responsive to the calibration signal; and using the transfer function to estimate the difference between the first value of the antenna system parameter and the second value of the antenna system parameter.

Alternatively, compensating the measurements may include generating a transfer function based on a resultant signal for each time responsive to the calibration signal; and using the transfer function to estimate the difference between the first value of the antenna system parameter and the second value of the antenna system parameter. The antenna system parameter may be impedance (or one of the other antenna system parameters described above), in which case the difference may be identified by feeding the calibration signal into the signal path at each of a plurality of frequencies over a frequency range derived from a transfer function of the antenna system, the frequency range including a resonance frequency of the antenna system; and estimating a change in values of resistance of the antenna system from each of the plurality of frequencies to any other of the plurality of frequencies as zero. Methods further include using the transfer function to estimate values of impedance of the antenna system as a function of frequency. The minimum frequency in the frequency range and the maximum frequency in the frequency range may each be close to the resonance frequency. At least one of the first measurement and the second measurement may be compensated by estimating an attenuation of the respective measurement based on a corresponding value of impedance for the compensated measurement.

Step 740 comprises using the compensated signal to estimate at least one parameter of interest of the formation in which the tool is located. Estimating parameters of interest may be carried out using all the compensated measurements in aggregation, at each of a plurality of borehole depths, using averaging, and so on as will occur to those of skill in the art. Step 740 may be carried out in substantially real time while on a single logging run while drilling.

Other optional steps include conducting secondary recovery operations in dependence upon the estimated parameter of interest. Secondary recovery operations may include any or all of drilling operations, injection operations, production operations, and the like. For example, the method may include commencing, modifying, continuing, or halting one or more drilling or production operations in dependence upon a model of the formation characterizing particular volumes of interest as having particular values of estimated true resistivity. The value for the antenna system parameter may also be used to estimate a condition of operation of the tool, e.g., whether the tool is functional within predefined thresholds of accuracy, the presence of damage or wear, an estimated useful remaining life of the antenna system, and the like.

Figure 7B:
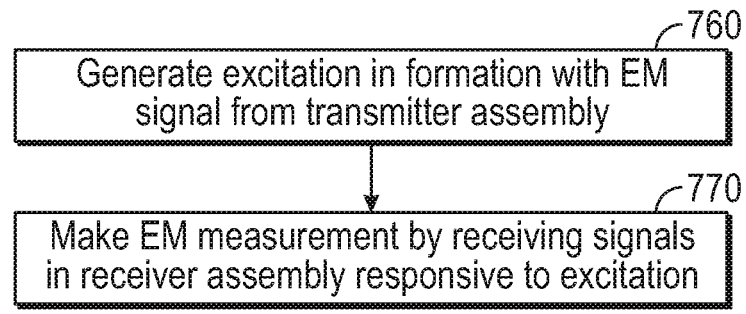
FIG. 7B illustrates methods for taking measurements in a borehole in accordance with embodiments of the present disclosure.

FIG. 7B illustrates methods for taking measurements in a borehole in accordance with embodiments of the present disclosure. Optional step 760 comprises generating an excitation in the formation with an electromagnetic (EM) signal from a transmitter assembly at at least one frequency. As one example, a propagating wave may be excited using a transmitter assembly as part of an EM tool as described above. The EM tool may include several connected or unconnected subs. Optional step 770 comprises making EM measurements using an EM tool on a tool string in the borehole by receiving a signal at at least one receiver assembly responsive to the excitation.

Steps 760 and 770 may be carried out by using at least one processor to direct or control transmitter and receiver assemblies directly, or by using commands to intermediate processors (e.g., controllers, DSPs, and the like) in operative connection with measurement circuitry including signal generators, amplifiers, power sources, data storage, etc. to generate and measure electromagnetic phenomena (e.g., currents, charges, fields, standing waves, or propagating waves, etc.). The at least one receiver assembly may include an induction antenna comprising a first winding and a second winding, and a capacitive shield encompassing the induction antenna. The first winding and the second winding may overlap on the tool string.

Figure 8:
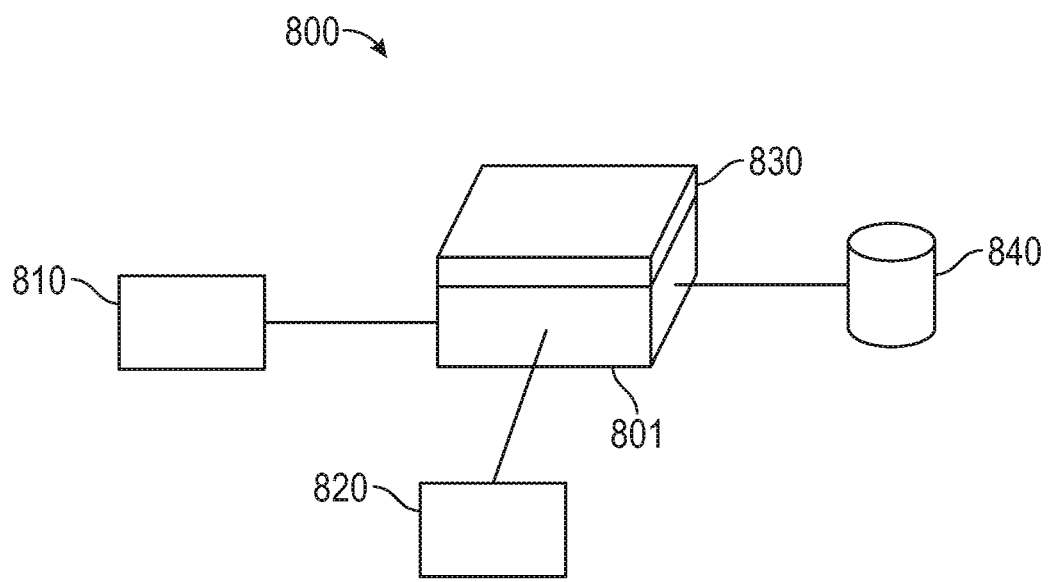
FIG. 8 shows an information processing system in accordance with embodiments of the present disclosure.

FIG. 8 shows an information processing system 800, which may be implemented with a hardware environment that includes a processor 801, an information storage medium 810, an input device 820, processor memory 830, and may include peripheral information storage medium 840. The hardware environment may be in the well, at the rig, or at a remote location. Moreover, the several components of the hardware environment may be distributed among those locations. The input device 820 may be any data reader or user input device, such as data card reader, keyboard, USB port, etc. The information storage medium 810 stores information provided by the detectors. Information storage medium 810 may include any non-transitory or non-volatile computer-readable medium for standard computer information storage, such as a USB drive, memory stick, hard disk, removable RAM, EPROMs, EAROMs, flash memories, optical disks, hard disks, or other commonly used memory storage system known to one of ordinary skill in the art including Internet or network based storage. Information storage medium 810 stores a program that when executed causes information processor 801 to execute the disclosed methods. Information storage medium 810 may also store the formation information provided by the user, or the formation information may be stored in a peripheral information storage medium 840, which may be any standard computer information storage device, such as a USB drive, memory stick, hard disk, removable RAM, or other commonly used memory storage system known to one of ordinary skill in the art including Internet or network based storage. Processor 801 may be any form of processor or mathematical processing hardware, including Internet or network based hardware. When the program is loaded from information storage medium 810 into processor memory 830 (e.g. computer RAM), the program, when executed, causes information processor 801 to retrieve sensor information from either information storage medium 810 or peripheral information storage medium 840 and process the information to estimate a parameter of interest. Processor 801 may be located on the surface or downhole (e.g., downhole tool 100).

In particular embodiments, such as, for example, a propagation resistivity tool, the frequency response of the tool can be determined by disconnecting the antenna from the electronic measurement system and applying a dual frequency signal to determine the frequency response. This frequency response may, in turn, be used to determine the antenna parameter.

Propagation delay on a data transmission channel (or the length of the channel) may be determined using the dual frequency technique. Such a channel could be in the simplest means a conductor cable, which is used to transmit information. A transmitter device may be configured for sending a signal, which consists of two signals with different frequencies, into this channel.

It is often the case that a transmission channel (e.g., wire) is represented not only by resistive components, but also inductive and capacitive components. These inductive and capacitive components act as undesirable parasitic components, and lead to a frequency dependent transmission characteristic of the channel. The signal component having a first frequency ($f_1$) will have a non-identical propagation delay as another signal component having a second frequency ($f_2$). The difference in propagation delays gives an estimate of the group delay and thus the transmission characteristic of the channel.

Figure 9:
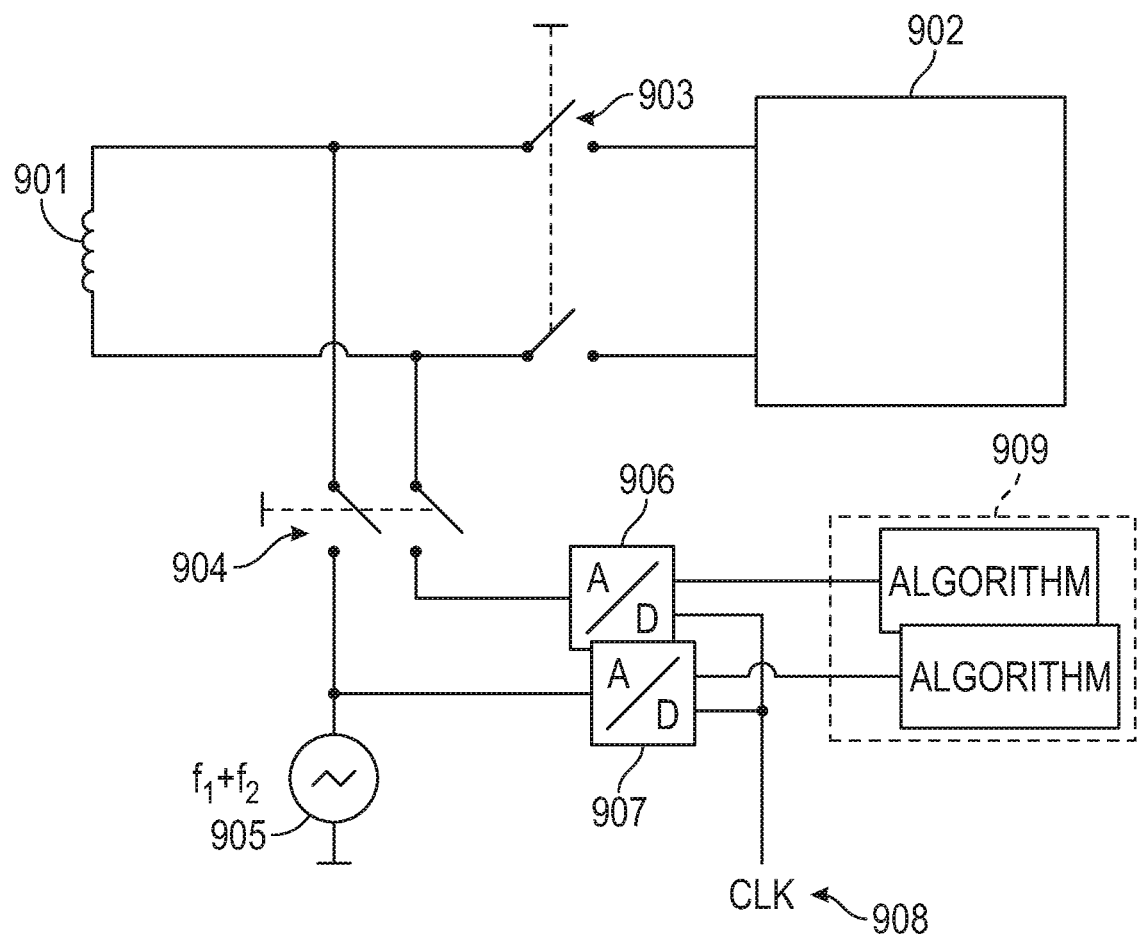
FIG. 9 shows an electrical schematic system in accordance with embodiments of the present disclosure.

FIG. 9 shows an electrical schematic illustrating alternative apparatus embodiments in accordance with embodiments of the present disclosure. The antenna 901 (e.g., a receiver antenna) of a downhole resistivity tool is connected to electronic circuitry 902 configured to sense the signal captured by the antenna. This circuitry may comprise sub-circuitries to match impedances, to gain the signal, to filter the signal and so on. The antenna may be disconnected from the circuitry. This function may be carried out with the use of a switch 903 (e.g., opening the switch 903), although other techniques may prove advantageous in particular applications. To determine the antenna parameter, electronic circuitry is connected to the antenna, e.g., by closing switch 904.

In operation, a signal generator 905 is connected with the first end of the antenna, after which it generates a multi-frequency signal (e.g., more than one frequency). The output of the signal generator may also be connected to an Analog-to-Digital converter (ADC) 907 for further processing of the signal. The other end of the antenna may be connected to another ADC 906 to digitize the signal for the determination of the frequency response, and thereby the antenna parameter.

Both ADC may be driven by the same clock source 908 to eliminate measurement uncertainties caused by different clock drifts, jitter, and the like. If the signal source 905 is a digital controlled device it may be beneficial to drive this also by this clock source. The block 909 depicts the digital signal processing unit (DSP), which can be a micro controller, a Digital Signal Processor or any other device which is able to process digitized signals. The DSP is intended to buffer the data from the ADC and to deploy an algorithm to each channel. The algorithm may include determining a Fourier-Transformation (e.g., FFT) of each channel. In alternative embodiments other algorithms may be used, such as but not limited to Discrete Fourier Transformation, Short-Time Fourier Transformation, Fractional Fourier Transformation, Hartley Transformation, Laplace Transformation, Mellin Transformation, Chirplet Transformation, or Hankel Transformation. The result of the Fourier Transform will be a complex number for each frequency line and can be commonly represented as $$\overline{U} = a + i \cdot b$$

The processing of digitized signals from the ADC gives four complex results. For the data from the signal source:

$$\overline{U_{SS}}(f_1) = a_{SS1} + i \cdot b_{SS1}$$

$$\overline{U_{SS}}(f_2) = a_{SS2} + i \cdot b_{SS2}.$$

For the data from the antenna output, the result will be $$\overline{U_{ANT}}(f_1) = a_{ANT1} + i \cdot b_{ANT1}$$

$$\overline{U_{ANT}}(f_2) = a_{ANT2} + i \cdot b_{ANT2}.$$

For each of these four complex expressions, a phase angle can be determined by $$\varphi = \arctan b/a,$$

and the absolute value is given by $$[z] = \sqrt[2]{a^2 + b^2}.$$

With the single phase angles a phase shift for each frequency may be determined.

$$\Delta\varphi_1 = \Delta_{ANT1} - \varphi_{SS1}$$

$$\Delta\varphi_2 = \Delta_{ANT2} - \varphi_{SS2}.$$

The attenuations can be calculated accordingly from the absolute value of the single signal levels.

$$ATT(f_1) = \sqrt[2]{a_{ANT1}^2 + b_{ANT1}^2} - \sqrt[2]{a_{SS1}^2 + b_{SS1}^2}$$

$$ATT(f_2) = \sqrt[2]{a_{ANT2}^2 + b_{ANT2}^2} - \sqrt[2]{a_{SS2}^2 + b_{SS2}^2}$$

Both phase shifts may be used to determine the phase response of the measured antenna and thus the group delay of the antenna. If the both attenuation values are taken into account the complete frequency response may be determined. Each of these parameters are indicative of antenna parameters, such as impedance or inductance. To improve the accuracy of this technique, the number frequencies may be increased. Thus, these aspects of the disclosure are not limited to two frequencies. The frequency response (Bode Diagram) may be determined from the results of a Fourier Transform to improve the accuracy of the antenna parameter calculation. While the waveform of the calibration signal usually is a sinusoidal signal, other waveforms might be deployed alternatively, such as saw tooth, triangle or square waveforms.

Aspects of the disclosure include digitization of analog signals. The antenna parameter of an antenna used on a downhole tool does not only depend on the antenna itself (e.g., properties of a ferrite material used in the antenna system, such as mechanical conditions, temperature, and so on. It also depends on the environment surrounding the antenna, such as the electrical properties of a borehole fluid and/or the formation in proximity to the downhole tool. Aspects of the disclosure may include separating different influences on the antenna system to characterize the current state of the tool.

For example, this could be solved by determining the influence of the drilling fluid and the formation in the proximity of the tool to the antenna parameter by modeling or experiment. Based on these results, a look-up table or a correction factor could be determined to correct the measured frequency response of the antenna, here also referred to as the reference frequency response. The electrical properties of the drilling fluid are usually known within acceptable accuracy, and the resistivity of the formation in proximity to the antenna can be captured from other resistivity tools (e.g. AziTrak). With these values, the proper correction factor could be selected from the look-up table or determined by using the parameter applied to the equations above.

Other embodiments may use multiple frequencies for the tool measurement and take the unknown formation in the proximity of the antenna into account for an applied inversion. An inversion algorithm could help to distinguish whether the parameter change is caused by a formation change or by wear on the antenna.

Implicit in the processing of the data is the use of logic implemented on a suitable medium, such as computer program instructions on non-transitory or non-volatile machine-readable medium (non-transitory or non-volatile computer-readable medium), that enables a processor to perform the control and processing.

In several non-limiting aspects of the disclosure, a processor includes a computer that executes programmed instructions for performing various methods. These instructions may provide for equipment operation, control, data collection and analysis and other functions in addition to the functions described in this disclosure. Thus, configuration of the processor may include operative connection with resident memory and peripherals for executing programmed instructions. The processor may execute instructions stored in computer memory accessible to the processor, or may alternatively employ logic implemented as field-programmable gate arrays ('FPGAs'), application-specific integrated circuits ('ASICs'), other combinatorial or sequential logic hardware, and so on.

In some embodiments, estimation of true resistivity or control of operations may involve applying a model. The model may include, but is not limited to, (i) a mathematical equation, (ii) an algorithm, (iii) a database of associated parameters, or a combination thereof.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors.

The term "substantially real-time" as applied to methods of the present disclosure refers to an action performed while the BHA is still downhole and prior to the drill bit extending the borehole a distance of 10 meter, 1 meter, 0.5 meters, 0.25 meters, 0.1 meters, or less; and may be defined as estimation of true resistivity within 30 minutes of measurement, 15 minutes of measurement, within 10 minutes of measurement, within 5 minutes of measurement, within 3 minutes of measurement, within 2 minutes of measurement, within 1 minute of measurement, or less.

While the foregoing disclosure is directed to specific embodiments of the disclosure, various modifications will be apparent to those skilled in the art. It is intended that all variations be embraced by the foregoing disclosure.

What is claimed is:

1. A method for performing electromagnetic (EM) logging in a borehole intersecting an earth formation using a measurement signal from an antenna system in the borehole, the antenna system comprising an antenna and circuitry configured to sense the measurement signal, the measurement signal dependent upon a parameter of interest of the earth formation and at least one antenna system parameter of the antenna system, the method comprising:
    feeding a calibration signal into a signal path of the antenna system in the borehole extending from the antenna in the antenna system in the borehole to generate a resultant signal, the calibration signal bypassing the earth formation;
    estimating at least one value of the at least one antenna system parameter of the antenna system in the borehole by using the resultant signal; and
    performing further logging operations in dependence upon the at least one value of the at least one antenna system parameter;
    the calibration signal comprising at least two calibration subsignals with a first calibration subsignal of the at least two calibration subsignals having a first frequency and a second calibration subsignal of the at least two calibration subsignals having a second frequency different than the first frequency.

2. The method of claim 1, wherein the at least one antenna system parameter comprises at least one of:
    i) a transfer function of at least a part of the antenna system;
    ii) a frequency of an extreme value of the transfer function of the part of the antenna system;
    iii) a frequency response of the part of the antenna system; and
    iv) a width of a peak of the transfer function.

3. The method of claim 1, wherein the at least one antenna system parameter comprises at least one of:
    i) resonance frequency of the antenna system;
    ii) antenna system impedance; and
    iii) antenna system moment.

4. The method of claim 1 wherein the antenna system comprises a transmitter assembly configured to transmit an excitation signal and a receiver assembly configured to receive the measurement signal.

5. The method of claim 1 wherein the calibration signal comprises at least three calibration subsignals, each calibration subsignal of the at least three calibration subsignals having a unique frequency.

6. The method of claim 5 wherein the at least three calibration subsignals form at least one swept frequency signal.

7. The method of claim 1 wherein a first calibration subsignal of the at least two calibration subsignals is fed into the signal path during a period of time that overlaps with a second calibration subsignal of the at least two calibration subsignals fed into the signal path.

8. The method of claim 7 comprising:
    estimating a frequency response of at least a part of the antenna system from the resultant signal; and
    estimating the at least one value of the at least one antenna system parameter from the frequency response.

9. The method of claim 8 further comprising:
    estimating the at least one value of the at least one antenna system parameter by comparing the frequency response with a reference frequency response.

10. The method of claim 1 wherein performing further logging operations comprises determining a value of the parameter of interest of the earth formation.

11. The method of claim 1 wherein performing further logging operations comprises performing at least one of:
    i) adjustment of the measurement signal;
    ii) adjustment of the signal path;
    iii) adjustment of an excitation signal of the antenna system.

12. The method of claim 1 comprising estimating a resonance frequency of the antenna system by performing at least one of:
    i) estimating a frequency of an extreme value of a transfer function of at least a part of the antenna system; and
    ii) estimating a width of a resonance peak of a transfer function.

13. The method of claim 1 wherein:
    the antenna system comprises at least one electronic component; and
    the logging operation comprises adjustment of at least one of the at least one electronic component.

14. The method of claim 1 wherein a first calibration subsignal of the at least two calibration subsignals is fed into the signal path during a first period of time and a second calibration subsignal of the at least two calibration subsignals is fed into the signal path during a second period of time different than the first period of time.

15. The method of claim 1 further comprising:
    monitoring values of the at least one antenna system parameter over time;
    detecting changes in the values of the at least one antenna system parameter meeting a threshold value; and
    responsive to detecting antenna system parameter changes meeting the threshold value, performing at least one of:
        i) storing at least one of the values of the at least one antenna system parameter; ii) transmitting at least one of the values of the at least one antenna system parameter to a surface of the earth; and iii) notifying a system operator.

16. An apparatus for evaluating an earth formation intersected by a borehole, the apparatus comprising:

an electromagnetic (EM) logging tool configured for conveyance in the borehole on a tool string and including an antenna system comprising at least one transmitter assembly and at least one receiver assembly comprising an antenna and circuitry configured to sense a measurement signal, and further configured to generate an excitation in the earth formation with an EM signal from the at least one transmitter assembly on the EM logging tool at at least one frequency;

the at least one receiver assembly on the EM logging tool configured to make EM measurements by receiving a signal at the receiver assembly responsive to the excitation; and at least one processor; wherein the antenna is connected to the at least one processor via a signal path extending from the antenna and configured to provide a measurement signal to the at least one processor responsive to the EM measurements, the measurement signal dependent upon a parameter of interest of the earth formation and at least one antenna system parameter of the antenna system; and wherein the at least one processor is configured to:

feed a calibration signal into the signal path extending from the antenna in the borehole to generate a resultant signal, the calibration signal bypassing the earth formation;

estimate at least one value of the at least one antenna system parameter of the antenna system in the borehole by using the resultant signal; and perform further logging operations in dependence upon the at least one value of the at least one antenna system parameter;

the calibration signal comprising at least two calibration subsignals with a first calibration subsignal of the at least two calibration subsignals having a first frequency and a second calibration subsignal of the at least two calibration subsignals having a second frequency different than the first frequency.

17. The apparatus of claim 16, wherein the at least one antenna system parameter comprises at least one of:
 i) a transfer function of at least a part of the antenna system;
 ii) a frequency of an extreme value of the transfer function of the part of the antenna system;
 iii) a frequency response of the part of the antenna system; and
 iv) a width of a peak of the transfer function.

18. The apparatus of claim 16, wherein the at least one antenna system parameter comprises at least one of:
 i) resonance frequency of the antenna system;
 ii) antenna system impedance;
 iii) antenna system moment;
 iv) antenna system inductance;
 v) antenna system capacitance;
 vi) antenna system resistance; and
 vii) antenna system quality factor.

19. The apparatus of claim 16 wherein the tool string is a drill string, and the apparatus comprises a drill bit at a distal end of the drill string.

20. The apparatus of claim 16 wherein the at least one transmitter assembly is configured to transmit an excitation signal and the at least one receiver assembly is configured to receive the measurement signal.

21. The apparatus of claim 16, further comprising at least one electronic component configured to be adjusted based on the at least one value of the at least one antenna system parameter.

22. The method of claim 1, wherein the at least one antenna system parameter comprises at least one of:
 i) antenna system inductance;
 ii) antenna system capacitance;
 iii) antenna system resistance; and
 iv) antenna system quality factor.

23. The method of claim 1 further comprising conducting a downhole operation in the borehole; and feeding the calibration signal into the signal path of the antenna system during the downhole operation.

24. The apparatus of claim 23 wherein the downhole operation is a drilling operation.

* * * * *